United States Patent [19]

Tulacs et al.

[11] Patent Number: 5,708,072
[45] Date of Patent: Jan. 13, 1998

[54] PROCESS FOR THE PREPARATION OF WATER-DILUTABLE COATING BINDERS, AND THE USE THEREOF

[75] Inventors: Laszlo Tulacs, Graz; Hans Hiden, St. Margarethen/Raab; Werner Wilfinger; Johann Luttenberger, both of Graz, all of Austria

[73] Assignee: Vianova Resins Aktiengesellschaft, Werndorf, Austria

[21] Appl. No.: 647,897

[22] PCT Filed: Dec. 5, 1994

[86] PCT No.: PCT/AT94/00186

§ 371 Date: Jun. 5, 1996

§ 102(e) Date: Jun. 5, 1996

[87] PCT Pub. No.: WO95/16004

PCT Pub. Date: Jun. 15, 1995

[30] Foreign Application Priority Data

Dec. 6, 1993 [AT] Austria .................................. 2462/93

[51] Int. Cl.$^6$ .................................................. C08L 75/00
[52] U.S. Cl. .................. 524/507; 524/539; 524/555; 524/591; 524/839; 524/840; 525/123; 525/127; 525/130
[58] Field of Search ........................ 524/555, 507, 524/539, 591, 839, 840; 525/123, 127, 130

[56] References Cited

U.S. PATENT DOCUMENTS

| | | | |
|---|---|---|---|
| 4,317,895 | 3/1982 | Guagliardo et al. | 524/500 |
| 4,318,833 | 3/1982 | Guagliardo | 524/457 |
| 4,489,135 | 12/1984 | Drexler et al. | 428/423.1 |
| 4,558,090 | 12/1985 | Drexler et al. | 524/591 |
| 4,851,460 | 7/1989 | Stranghöner et al. | 523/407 |
| 4,880,867 | 11/1989 | Gobel et al. | 524/507 |
| 4,981,885 | 1/1991 | Engel et al. | 523/409 |
| 5,334,420 | 8/1994 | Hartung et al. | 427/407.1 |
| 5,342,882 | 8/1994 | Göbel et al. | 524/832 |

FOREIGN PATENT DOCUMENTS

| | | |
|---|---|---|
| 0 438 090 | 7/1991 | European Pat. Off. . |
| 0 297 576 | 1/1992 | European Pat. Off. . |
| 0 226 171 | 5/1992 | European Pat. Off. . |
| 32 10 051 | 9/1983 | Germany . |
| 36 28 124 | 3/1988 | Germany . |
| 36 28 125 | 3/1988 | Germany . |
| 38 41 540 | 6/1990 | Germany . |
| 42 23 182 | 7/1993 | Germany . |
| 42 24 617 | 1/1994 | Germany . |

*Primary Examiner*—Edward J. Cain
*Attorney, Agent, or Firm*—Foley & Lardner

[57] ABSTRACT

A process is disclosed for preparing water-dilutable enamel paint binders based on oligourethane-acrylate copolymers. A specific monomer mixture is polymerized in the presence of a water-insoluble oligourethane obtained by reacting an aliphatic ester diol with a diisocyanate. Water dilutability is achieved by using (meth)acrylic acid. These enamel paint binders are used in combination with cross-linking components and if required other enamel paint binders to formulate baking enamels.

20 Claims, No Drawings

PROCESS FOR THE PREPARATION OF WATER-DILUTABLE COATING BINDERS, AND THE USE THEREOF This application is a 371 of PCT/AT94/00186 filed Dec. 5, 1994, published as WO95/16004 Jun. 15, 1995.

BACKGROUND OF THE INVENTION

1. Field of the Invention

The invention relates to a process for the preparation of water-dilutable coating binders based on oligourethane-acrylate copolymers, and to the coating binders preparable by this process and to their use in the formulation of storing enamels.

2. Description of Related Art

From the extensive patent literature it is evident that coating binders containing urethane groups and proportions of acrylate copolymers are becoming increasingly important, in the form of dispersions, for the formulation of high-grade, water-thinnable, oven-drying topcoats. Examples which may be mentioned are the products as described in DE 3210051 A1, DE 3628124 A1, DE 3628125 A1, DE 3841540 A1, DE 4223182 C1, EP 0226171 B1, EP 0297576 B1 and EP 0438090 A1. Coating binders of this kind are in many cases encountered as mixtures in which the binder components are not sufficiently compatible, and coating materials formulated with these binders have too short a shelf life.

U.S. Pat. No. 4,317,895 recommends thermoplastic acrylic-urethane copolymers as non-water-dilutable binders for automotive topcoats, the solvents preferably employed being ketones and acetates.

Products analogous to these but dilutable in water are known from U.S. Pat. No. 4,318,833. They are obtained by polymerization of ethylenically unsaturated monomers, preferably (meth)acrylates, in the presence of polyurethanes whose dilutability in water is achieved by the incorporation of dimethylolpropionic acid.

SUMMARY OF THE INVENTION

It has now been found that water-dilutable acrylic-urethane copolymers can be prepared by using as starting product a water-insoluble oligourethane and by introducing carboxyl groups into the binder by means of the additional use of (meth)acrylic acid in the monomer mixture.

The present invention accordingly relates to a process for the preparation of coating binders which are based on oligourethane-acrylate copolymers and which are dilutable in water following at least partial neutralization of the carboxyl groups, which process is characterized in that (A) a monomer mixture containing
   (Aa) from 40 to 70% by weight of alkyl (meth)acrylates whose alkyl radicals have 2 to 4 carbon atoms,
   (Ab) from 5 to 20% by weight of hydroxyalkyl (meth) acrylates whose alkylene radicals have 2 to 4 carbon atoms,
   (Ac) from 3 to 15% by weight of (meth)acrylic acid,
   (Ad) from 10 to 35% by weight of aromatic vinyl compounds, preferably styrene,
   the sum of the percentages for components (Aa) to (Ad) necessarily giving the number 100, and the components (Aa) to (Ad) being selected such that in theory a corresponding acrylate copolymer would have an acid number of from 30 to 90 mg of KOH/g, a hydroxyl number of from 30 to 50 mg of KOH/g and a glass transition temperature of from $-5°$ to $+25°$ C., is copolymerized in a water-dilutable organic solvent in the presence of a free-radical polymerization initiator and of a (B) water-insoluble oligourethane which has been obtained by the reaction of an aliphatic ester diol or of a mixture of such diols with diisocyanates, contains no free isocyanate groups and has a hydroxyl number of from 110 to 150 mg of KOH/g, a nitrogen content of from 2.8 to 3.7% by weight and a molecular mass of from 750 to 1000, with the proviso that the proportion of component (B) in the end product (AB) is from 35 to 60% by weight and said end product has an acid number of from 15 to 45 mg of KOH/g, a hydroxyl number of from 75 to 110 mg of KOH/g and an intrinsic viscosity (1.5% strength in chloroform/20° C.) of from 13.5 to 16.5 ml/g.

The invention furthermore relates to the water-dilutable coating binders preparable by this process and to their use, in combination with crosslinking components and, if desired, with other coating binders, in the formulation of storing enamels.

DETAILED DESCRIPTION OF PREFERRED EMBODIMENTS

The polymerization of a specific monomer mixture is thus carried out in the presence of the water-insoluble oligourethane, the polymer which forms acting increasingly as emulsifier for the water-insoluble oligourethane, which is incompatible in a mixture with the corresponding acrylate copolymer (see Comparative Examples).

The raw materials and preparation methods used for the process according to the invention are known in principle to the person skilled in the art, so that reference need only be made to specific selection criteria.

In accordance with the claims, the monomer mixture (A) contains (Aa) from 40 to 70% by weight of alkyl (meth)acrylates whose alkyl radicals have 2 to 4 carbon atoms, (Ab) from 5 to 20% by weight of hydroxyalkyl (meth) acrylates whose alkylene radicals have 2 to 4 carbon atoms, (Ac) from 3 to 15% by weight of (meth)acrylic acid, (Ad) from 10 to 35% by weight of aromatic vinyl compounds, preferably styrene, the sum of the percentages for components (Aa) to (Ad) necessarily giving 100. The selection of the monomer composition is subject to the further requirement that, in theory, a corresponding acrylate copolymer would have an acid number of from 30 to 90 mg of KOH/g, a hydroxyl number of from 30 to 50 mg of KOH/g and a glass transition temperature of from $-5°$ to $+25°$ C.

The water-insoluble oligourethane (B) is obtained by reacting an aliphatic ester diol or a mixture of such diols with diisocyanates. Examples of suitable diols and diisocyanates are described in EP 0089497 B1, with preference being given to employing ester diols composed of linear aliphatic diols and dicarboxylic acids each having from 2 to 6 carbon atoms in the molecule and tolylene diisocyanate (as the usual commercial isomer mixture) and 3-(isocyanatomethyl)-3,5,5-trimethylcyclohexyl isocyanate (isophorone diisocyanate).

The water-insoluble oligourethane (B) contains no free isocyanate groups and is defined by a hydroxyl number of from 110 to 150 mg of KOH/g, a nitrogen content of from 2.8 to 3.7% by weight and a molecular mass of from 750 to 1000.

The monomer mixture (A) is copolymerized in the presence of the water-insoluble oligourethane (B) by adding the monomer mixture (A) and the polymerization initiator continuously to a solution of the water-insoluble oligourethane (B) in water-dilutable organic solvents such as monoalcohols or glycol ethers.

The proportion of components (B) in the end product (AB) is from 35 to 60% by weight. This end product has an acid number of from 15 to 45 mg of KOH/g, a hydroxyl number of from 75 to 110 mg of KOH/g and an intrinsic viscosity (1.5% strength in chloroform/20° C.) of from 13.5 to 16.5 ml/g.

The oligourethane-acrylate copolymer is converted into a water-dilutable form by at least partial neutralization of the carboxyl groups with organic bases, preferably with tertiary alkylamines and/or alkanolamines. If desired, the organic solvents used in the preparation may be removed in whole or in part by vacuum distillation during the dilution procedure.

The binders preparable in accordance with the invention are used, in combination with crosslinking components and, if desired, with other coating binders, in the formulation of high-grade storing enamels.

The binders preparable in accordance with the invention are particularly suitable for the production of water-dilutable basecoats as are employed, for example, in automotive production-line finishing for two-coat finishes consisting of a colored and/or specialeffect basecoat and a clearcoat.

Such water-dilutable basecoats additionally contain—optionally in combination with additional water-dilutable binders—crosslinking components, preferably amino resins and/or blocked polyiso-cyanates, and also the additives, fillers and pigments which are familiar to the person skilled in the art.

Suitable additional water-dilutable binders, which can also be used as paste resins, are, in particular, polyester resins, polyacrylate resins and polyurethane resins.

The water-dilutable basecoats are applied in a known manner in combination with clearcoats and are crosslinked at temperatures of up to 160° C.

The examples illustrate the invention without limiting its scope. All parts and percentages relate to units by weight. The following abbreviations are used in the examples:

| | |
|---|---|
| TDI | Tolylene diisocyanate (usual commercial isomer mixture, MW 174) |
| IPDI | Isophorone diisocyanate (3-(isocyanatomethyl)-3,5,5-trimethylcyclohexyl isocyanate, MW 222) |
| BUGL | Monoethylene glycol monobutyl ether |
| AA | Acrylic acid |
| MA | Methacrylic acid |
| AAEE | Ethyl acrylate |
| AABE | n-Butyl acrylate |
| MAME | Methyl methacrylate |
| MAIBE | Isobutyl methacrylate |
| STY | Styrene |
| MSTY | p-Methylstyrene |
| HPA | 2-Hydroxypropyl acrylate |
| HBA | 4-Hydroxybutyl acrylate |
| HEMA | Hydroxyethyl methacrylate |
| HPMA | 2-Hydroxypropyl methacrylate |

1. Preparation of the oligourethanes (B1) to (B5)

1.1. General preparation procedure (see Table 1 in this respect)

2 mol of an ester diol composed of 2 mol of a linear aliphatic diol and 1 mol of a linear aliphatic dicarboxylic acid (prepared in the presence of 0.2–0.4 g of dibutyltin dilaurate) are reacted with 1 mol of a diisocyanate such that the reaction product contains no free isocyanate groups, and has an acid number of less than 3 mg of KOH/g and an OH number as indicated in Table 1. The oligourethane, which has a solids content of at least 98% by weight, is diluted with BUGL to a solids content of 75% by weight.

2. EXAMPLES 1 to 5

Preparation of the oligourethane-acrylate copolymers (AB1) to (AB5)

2.1. General preparation procedure (see Table 2 in this respect)

67 parts of BUGL and the oligourethane, 75% in BUGL, are introduced as initial charge in a reaction vessel fitted with stirrer, initiator feed vessel, monomer feed vessel, thermometer, inert gas apparatus, heating and reflux condenser, and are heated to 125° C. under a blanket of inert gas. The monomer mixture and di-tert-butyl peroxide (1 part, as a 20% strength solution in BUGL) are then fed in in parallel at a rate such that the addition is concluded after 6 hours. After a further 2 hours at 125° C., di-tert-butyl peroxide (0.5 part) is again added to the batch. The reaction temperature is increased to 150° C. and maintained for 3 hours. The oligourethane-acrylate copolymer, which has the characteristics indicated in Table 2, is diluted with BUGL to a solids content of 60% by weight.

3. Comparison Examples 1 to 5

Preparation of the acrylate copolymers (C1) to (C5)

3.1. General preparation procedure (see Table 2 in this respect)

In accordance with the information under 2.1. 35 parts of BUGL are introduced as initial charge, the monomer mixture is polymerized under identical reaction conditions, and the product is diluted with BUGL to a solids content of 60% (characteristics see Table 2).

The mixtures of the acrylate copolymers (C1) to (C5) with the oligourethanes (B1) to (B5) in accordance with the ratios in (AB1) to (AB5) are incompatible (clouding and/or phase separation).

4. Coatings performance testing of the oligourethane-acrylate copolymers (AB1) to (AB5)

4.1. Water-thinnable white paint

Water-thinnable white paints with a composition of acrylate copolymer/Resydrol® WM 501[1]=78/22, TiO$_2$ Kronos® CL 310[2]/total coating binder=1/1 (based in each case on solids), which contain commercially available levelling agents and antifoams, are applied to steel panels and baked for 30 minutes at 140° C.

[1] reactive, water-compatible melamine resin, manufacturer: VIANOVA KUNSTHARZ AG, AT
[2] rutile type: KRONOS, DE The paint films exhibit good gloss, excellent mechanical properties and good resistance to acetone.

TABLE 1

| Oligo-urethane | Aliph. diol (MW) | Aliph. di-carboxylic acid (MW) | MW of the ester diol | Isocyanate | OH Number mg of KOH/g | N content | MW |
|---|---|---|---|---|---|---|---|
| (B1) | diethylene glycol (106) | succinic acid (118) | 294 | TDI | about 147 | 3.7% | 763 |
| (B2) | 1,6-hexanediol (118) | adipic acid (146) | 346 | TDI | about 130 | 3.2% | 867 |
| (B3) | triethylene glycol (150) | glutaric acid (132) | 396 | TDI | about 116 | 2.9% | 967 |
| (B4) | 1,4-butanediol (90) | pimelic acid (160) | 304 | IPDI | about 134 | 3.4% | 831 |
| (B5) | 1,3-butanediol (90) | pimelic acid (160) | 304 | TDI | about 143 | 3.6% | 783 |

TABLE 2

| | Example | | | | |
|---|---|---|---|---|---|
| | 1 (AB1) | 2 (AB2) | 3 (AB3) | 4 (AB4) | 5 (AB5) |
| Oligourethane (B) (as solids) | | | | | |
| (B1) | 30 | | | 60 | 120 |
| (B2) | 70 | | | 40 | |
| (B3) | | 30 | | | |
| (B4) | | 70 | | | |
| (B5) | | | 60 | | |
| Monomer mixtures (A1) to (A5) and acrylate copolymers (C1) to (C5) | | | | | |
| AA | 7.5 | | 8.0 | 5.0 | 8.0 |
| MA | | 12.0 | | | |
| AAEE | 55.0 | 20.0 | 37.0 | 60.0 | 50.0 |
| AABE | | 25.0 | | | |
| MAME | 12.5 | | 28.0 | | |
| MAIBE | | 22.0 | | | |
| STY | 15.0 | | 15.0 | 27.0 | 30.0 |
| MSTY | | 10.0 | | | |
| HPA | 10.0 | | 12.0 | | |
| HBA | | 11.0 | | | |
| HEMA | | | | 8.0 | |
| HPMA | | | | | 12.0 |
| Acid No. mg of KOH/g | 58 | 78 | 62 | 39 | 62 |
| OH No. mg of KOH/g | 43 | 43 | 47 | 34 | 47 |
| Tg in °C. | 7.2 | 0.1 | 24.3 | 13.5 | 20.4 |
| Proportion of (B) in % by weight | 50 | 50 | 37.5 | 50 | 54.5 |
| Acid No. mg of KOH/g | 29 | 39 | 38 | 19 | 28 |
| OH No. mg of KOH/g | 89 | 86 | 82 | 87 | 100 |
| IV No. ml/g | 15.2 | 16.2 | 14.9 | 14.1 | 13.9 |

4.2. Lime-green water-dilutable basecoat 4.2.1. Preparation of a green pigment paste 20 parts of a chlorinated phthalocyanine pigment are predispersed using a dissolver in a mixture of 20 parts of a paste resin according to EP 0438090 A1 (paste resin 1), 35 parts of butoxyethanol and 0.5 parts of dimethylethanolamine and this mixture is then dispersed in a beadmill. The pigment paste is subsequently diluted with 24.5 parts of deionized water.

4.2.2. Preparation of a white pigment paste 60 parts of titanium dioxide are predispersed using a dissolver in a mixture of 10 parts of a paste resin according to EP 0438090 A1 (paste resin 1), 15 parts of butoxyethanol and 0.5 parts of dimethylethanolamine and this mixture is then dispersed in a beadmill. The pigment paste is subsequently diluted with 14.5 parts of deionized water.

4.2.3. Preparation and application of the lime-green water-dilutable basecoat

In a dissolver, 11 parts of the oligourethane-acrylate copolymer (AB 4) are neutralised with 0.5 parts of dimethylethanolamine. 12 parts of a 2:1 mixture of butylglycol and butyldiglycol, 2 parts of a commercially available antifoam, 4 parts of an acidic acrylate thickener, 24 parts of a polyurethane dispersion according to DE-A-4224617 (Preparation Example 2) and 5 parts of crosslinking agent (Cymel 323) are added. After homogenisation of the mixture, 10 parts of the green pigment paste obtained under 4.2.1. and 3 parts of the white pigment paste obtained under 4.2.2. are added to the mixture. Homogeneous mixing is again carried out, and the mixture is diluted with 28.5 parts of deionized water.

The basecoat is applied to a phosphatized bodywork panel, which has been precoated with a cathodic deposition coat and with a filler, by spraying, in a dry-film thickness of 20 μm. This coating is then flashed off at room temperature for 10 minutes, predried at 80° C. for 10 minutes, and overcoated with a commercially available, acrylate resin-based automotive production-line clearcoat, which cures by means of melamine resin, in a dry-film thickness of 35 μm. The two-coat finish is baked at 130° C. (panel temperature) for 30 minutes.

The multi-coat paint system thus obtained meets, in terms of its optical and mechanical properties, all of the requirements set by the automotive industry.

What is claimed is:

1. A process for the preparation of coating binders based on oligourethane-acrylate copolymers, which are dilutable in water following at least partial neutralization of the carboxyl groups, wherein:
   (A) a monomer mixture containing
      (Aa) from 40 to 70% by weight of alkyl (meth)acrylates whose alkyl radicals have 2 to 4 carbon atoms,
      (Ab) from 5 to 20% by weight of hydroxyalkyl (meth) acrylates whose alkylene radicals have 2 to 4 carbon atoms,
      (Ac) from 3 to 15% by weight of (meth)acrylic acid,
      (Ad) from 10 to 35% by weight of aromatic vinyl compounds, preferably styrene,
   the sum of the percentages for components (Aa) to (Ad) necessarily giving the number 100, and the components (Aa) to (Ad) being selected such that in theory a corresponding acrylate copolymer would have an acid number of from 30 to 90 mg of KOH/g, a hydroxyl number of from 30 to 50 mg of KOH/g and a glass transition temperature of from −5° to +25° C., is copolymerized in a water-dilutable organic solvent in the presence of a free-radical polymerization initiator and in the presence of (B) a water-insoluble oligourethane which: has been obtained by the reaction of monomers consisting essentially of an aliphatic ester diol or of a mixture of such diols with diisocyanates: contains no free isocyanate groups; and has a hydroxyl number of from 110 to 150 mg of KOH/g, a nitrogen content of from 2.8 to 3.7% by weight and a molecular mass of from 750 to 1000, with the proviso that the proportion of component (B) in the end product (AB) is from 35 to 60% by weight and said end product has an acid number of from 15 to 45 mg of KOH/g, a hydroxyl number of from 75 to 110 mg of KOH/g and an intrinsic viscosity (1.5% strength in chloroform/20° C.) of from 13.5 to 16.5 ml/g.

2. Water-dilutable coating binders prepared in accordance with the process of claim 1.

3. A method of making stoving enamels comprising combining the water-dilutable coating binders prepared according to claim 1 with crosslinking components and, if desired, with other coating binders.

4. A method of making a water-dilutable basecoat comprising combining the water-dilutable coating binders prepared according to claim 1 with crosslinking components and other coating raw materials.

5. Process for the production of two-coat paint systems, characterized in that, after the application of a basecoat to a substrate, a further clearcoat is applied, the basecoat containing the binders preparable according to claim 1.

6. A process according to claim 1, wherein the aliphatic ester diol is comprised of linear aliphatic ester diols and aliphatic dicarboxylic acids.

7. A process as claimed in claim 6, wherein the linear aliphatic ester diols are selected from one or more of the group consisting of diethylene glycol, 1,6-hexanediol, triethylene glycol, 1,4-butanediol and 1,3-butanediol.

8. A process as claimed in claim 6, wherein the aliphatic dicarboxylic acids are selected from one or more of the group consisting of succinic acid, adipic acid, glutaric acid and pimelic acid.

9. A process as claimed in claim 1, wherein the diisocyanates are selected from tolylene diisocyanate or 3-(isocyanatomethyl)-3,5,5-trimethylcyclohexyl isocyanate.

10. A process as claimed in claim 1, wherein the alkyl (meth)-acrylates are selected from the group consisting of ethyl acrylate, n-butyl acrylate, methyl methacrylate and isobutyl methacrylate.

11. A process as claimed in claim 1, wherein the hydroxyalkyl (meth)-acrylates are selected from the group consisting of 2-hydroxypropyl acrylate, 4-hydroxybutyl acrylate, hydroxyethyl methacrylate and 2-hydroxypropyl methacrylate.

12. A process as claimed in claim 1, wherein the aromatic vinyl compounds are selected from styrene and p-methylstyrene.

13. A water-dilutable coating binder according to claim 2, wherein the aliphatic ester diol is comprised of linear aliphatic ester diols and aliphatic dicarboxylic acids.

14. A water-dilutable coating binder as claimed in claim 13, wherein the linear aliphatic ester diols are selected from one or more of the group consisting of diethylene glycol, 1,6-hexanediol, triethylene glycol, 1,4-butanediol and 1,3-butanediol.

15. A water-dilutable coating binder as claimed in claim 13, wherein the aliphatic dicarboxylic acids are selected from one or more of the group consisting of succinic acid, adipic acid, glutaric acid and pimelic acid.

16. A water-dilutable coating binder as claimed in claim 2, wherein the diisocyanates are selected from tolylene diisocyanate or 3-(isocyanatomethyl)-3,5,5-trimethylcyclohexyl isocyanate.

17. A water-dilutable coating binder as claimed in claim 2, wherein the alkyl (meth)-acrylates are selected from the group consisting of ethyl acrylate, n-butyl acrylate, methyl methacrylate and isobutyl methacrylate.

18. A water-dilutable coating binder as claimed in claim 2, wherein the hydroxyalkyl (meth)-acrylates are selected from the group consisting of 2-hydroxypropyl acrylate, 4-hydroxybutyl acrylate, hydroxyethyl methacrylate and 2-hydroxypropyl methacrylate.

19. A water-dilutable coating binder as claimed in claim 2, wherein the aromatic vinyl compounds are selected from styrene and p-methylstyrene.

20. A process for the preparation of coating binders based on oligourethane-acrylate copolymers, which are dilutable in water following at least partial neutralization of the carboxyl groups, wherein:

(A) a monomer mixture containing (Aa) from 40 to 70% by weight of alkyl (meth)acrylates whose alkyl radicals have 2 to 4 carbon atoms, (Ab) from 5 to 20% by weight of hydroxyalkyl (meth) acrylates whose alkylene radicals have 2 to 4 carbon atoms, (Ac) from 3 to 15% by weight of (meth)acrylic acid, (Ad) from 10 to 35% by weight of aromatic vinyl compounds, preferably styrene, the sum of the percentages for components (Aa) to (Ad) necessarily giving the number 100, and the components (Aa) to (Ad) being selected such that in theory a corresponding acrylate copolymer would have an acid number of from 30 to 90 mg of KOH/g, a hydroxyl number of from 30 to 50 mg of KOH/g and a glass transition temperature of from −5° to +25° C., is copolymerized in a water-dilutable organic solvent in the presence of a free-radical polymerization initiator and in the presence of (B) a water-insoluble oligourethane which: has been obtained by the reaction of an aliphatic ester diol or of a mixture of such diols with diisocyanates; contains no free isocyanate groups; contains no polymerizable double bonds; and has a hydroxyl number of from 110 to 150 mg of KOH/g, a nitrogen content of from 2.8 to 3.7% by weight and a molecular mass of from 750 to 1000, with the proviso that the proportion of component (B) in the end product (AB) is from 35 to 60% by weight and said end product has an acid number of from 15 to 45 mg of KOH/g, a hydroxyl number of from 75 to 110 mg of KOH/g and an intrinsic viscosity (1.5% strength in chloroform/20° C.) of from 13.5 to 16.5 ml/g.

* * * * *